(12) United States Patent
Wang et al.

(10) Patent No.: US 10,703,031 B2
(45) Date of Patent: Jul. 7, 2020

(54) METHOD OF INJECTION MOLDING AN ARTICLE

(71) Applicant: SABIC GLOBAL TECHNOLOGIES B.V., Bergen op Zoom (NL)

(72) Inventors: Lingshan Wang, Shanghai (CN); Xiuqiang Zhang, Shanghai (CN); Fei Shen, Shanghai (CN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/067,257

(22) PCT Filed: Dec. 28, 2016

(86) PCT No.: PCT/IB2016/058061
§ 371 (c)(1),
(2) Date: Jun. 29, 2018

(87) PCT Pub. No.: WO2017/115307
PCT Pub. Date: Jul. 6, 2017

(65) Prior Publication Data
US 2019/0022906 A1    Jan. 24, 2019

Related U.S. Application Data

(60) Provisional application No. 62/273,230, filed on Dec. 30, 2015.

(51) Int. Cl.
*B29C 45/13* (2006.01)
*B29C 45/16* (2006.01)
(Continued)

(52) U.S. Cl.
CPC ...... *B29C 45/1635* (2013.01); *B29C 45/0025* (2013.01); *B29C 45/36* (2013.01);
(Continued)

(58) Field of Classification Search
CPC ............... B29C 45/1635; B29C 45/36; B29C 2045/003; B29C 2045/0032;
(Continued)

(56) References Cited

U.S. PATENT DOCUMENTS

| 5,342,002 A | 8/1994 | Morita |
| 6,224,364 B1 * | 5/2001 | Harvey ............... B29C 45/1615 264/328.7 |
| 2008/0191388 A1 * | 8/2008 | Bultermann ........ B29C 45/1639 264/297.1 |

FOREIGN PATENT DOCUMENTS

| DE | 3607410 A1 | 9/1987 |
| JP | 62122726 A | 6/1987 |

OTHER PUBLICATIONS

International Preliminary Report on Patentability for International Application No. PCT/IB2016/058061; International Filing Date: Dec. 28, 2016; dated Mar. 21, 2017; 20 Pages.
(Continued)

*Primary Examiner* — Jodi C Franklin
*Assistant Examiner* — Alexander A Wang
(74) *Attorney, Agent, or Firm* — Cantor Colburn LLP

(57) ABSTRACT

The present invention relates to articles, systems, and methods for injection molding an article. The method includes directing a first shot of molten polymeric material into a mold cavity to form a first part while simultaneously occluding a portion of the gate orifice area with a mold core. Once the first shot is solidified, then the mold core is withdrawn and a second shot is directed into the space previously occupied by the mold core while a portion of the gate orifice area is occluded by the solidified first shot.

25 Claims, 10 Drawing Sheets

(51) Int. Cl.
*B29C 45/36* (2006.01)
*B29C 45/00* (2006.01)

(52) U.S. Cl.
CPC ...... *B29C 45/13* (2013.01); *B29C 2045/0027* (2013.01); *B29C 2045/0043* (2013.01); *B29C 2045/363* (2013.01)

(58) Field of Classification Search
CPC .... B29C 2045/0041; B29C 2045/0089; B29C 2045/1687; B29C 2045/2683; B29C 2045/363; B29C 2045/366
See application file for complete search history.

(56) References Cited

OTHER PUBLICATIONS

International Search Report for International Application No. PCT/IB2016/058061; International Filing Date: Dec. 28, 2016; dated Mar. 21, 2017; 6 Pages.

Machine Translation of DE3607410; Date of Publication: Sep. 10, 1987; 3 Pages.

Written Opinion of the International Searching Authority for International Application No. PCT/IB2016/058061; International Filing Date: Dec. 28, 2016; dated Mar. 21, 2017; 8 Pages.

* cited by examiner

METHOD OF INJECTION MOLDING AN ARTICLE

CROSS REFERENCE TO RELATED APPLICATIONS

This application is a 371 of International Application No. PCT/IB2016/058061, filed Dec. 28, 2016, which claims priority to U.S. Application Ser. No. 62/273,230 filed Dec. 30, 2015, which are incorporated herein by reference in their entirety.

BACKGROUND

Traditional product development processes often involve creating, testing, and validating three dimensional models of a proposed design. One method of doing so is to create a polymer article (e.g., a quadrilateral block of polymeric material) that is then machined (e.g., computer numerical control machining) to create all or some portion of the proposed test design. The polymeric article may be created by injection molding many layers of the polymeric material on top of one another.

OVERVIEW

The present inventors have recognized, among other things, that traditional development product processes are relatively long and costly. The present invention can help reduce the time and cost associated with traditional development processes by shortening the time needed to injection mold a polymeric article and by enabling the injection molding process to be performed on molding machines that are typically less costly.

The present invention relates to articles, systems, and methods for forming an article via an injection molding process. The method includes directing a first shot of molten polymeric material into a mold cavity to form a first part while simultaneously occluding a portion of the gate orifice area with a mold core. Once the first shot is solidified, then the mold core is withdrawn and a second shot is directed into the space previously occupied by the mold core while a portion of the gate orifice area is occluded by the solidified first shot.

This overview is intended to provide an overview of subject matter of the present patent application. It is not intended to provide an exclusive or exhaustive explanation of the invention. The detailed description is included to provide further information about the present patent application.

BRIEF SUMMARY OF THE INVENTION

In one example, the present invention includes a method of injection molding an article that comprises providing an injection molding machine that includes a melt source of molten material, a mold defining a mold cavity, one or more gates in fluid communication with the melt source and the mold cavity, and a mold core movable relative to the one or more gates. The one or more gates collectively define a total orifice area. The method further comprises directing a first shot of molten material the mold cavity through a first portion of the total orifice area while simultaneously a second portion of the total orifice area is occluded with the mold core. The first shot of molten material is solidified to form a first part of the article. The mold core is directed away from the one or more gates after the first part has been formed and a second shot of molten material is directed into the mold cavity through the second portion of the total orifice area while simultaneously occluding the first portion of the total orifice area with the first part of the article. The second shot of molten material is solidified to form a second part of the article.

In another example, the present invention includes a method of injection molding an article that comprises using an injection molding machine that includes a melt source of molten material, a mold defining a mold cavity, one or more gates, preferably two or more gates, in fluid communication with the melt source and the mold cavity, and a mold core movable relative to the gates. The gate(s) collectively define a total orifice are and the mold core includes a plurality of prongs with parallel opposing surfaces. The method further comprises contacting the gate(s) with the prongs of the mold core to occlude a first portion of the total orifice area, where the prongs of the mold core at least partially define a first shot space along the parallel opposing surfaces of the prongs and where the prongs occupy a second shot space. A first shot of molten material is directed into the first shot space and solidified to form a first part of the article occupying the first shot space. The method further comprises directing the prongs of the mold core away from the gate(s) to remove the prongs from the second shot space after the first part is formed, where the first part at least partially defines the second shot space. A second shot of molten material is directed into the second shot space while the first part contacts the gate(s) and occludes a second portion of the total orifice area. The second shot of molten material is solidified to form a second part of the article.

The present invention provides for shortened time in producing polymeric blocks via injection molding. Whereas prior art methods of creating polymeric blocks by injecting layer after layer of plastics may take 45 to 60 minutes, the present inventive method provides a way of forming all or most of the layers with just two injection shots and in just a fraction of the time (e.g., within 5 minutes). Further, by reducing the number of shots, the resulting block may have superior physical characteristics over blocks formed by the prior art methods, such as increased strength or decreased warping. Also, the present invention provides methods of forming the polymeric blocks on single shot injection machines instead of more expensive two-component injection machines.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present invention relates to articles, systems, and methods for forming an article via injection molding.

Figure 1:
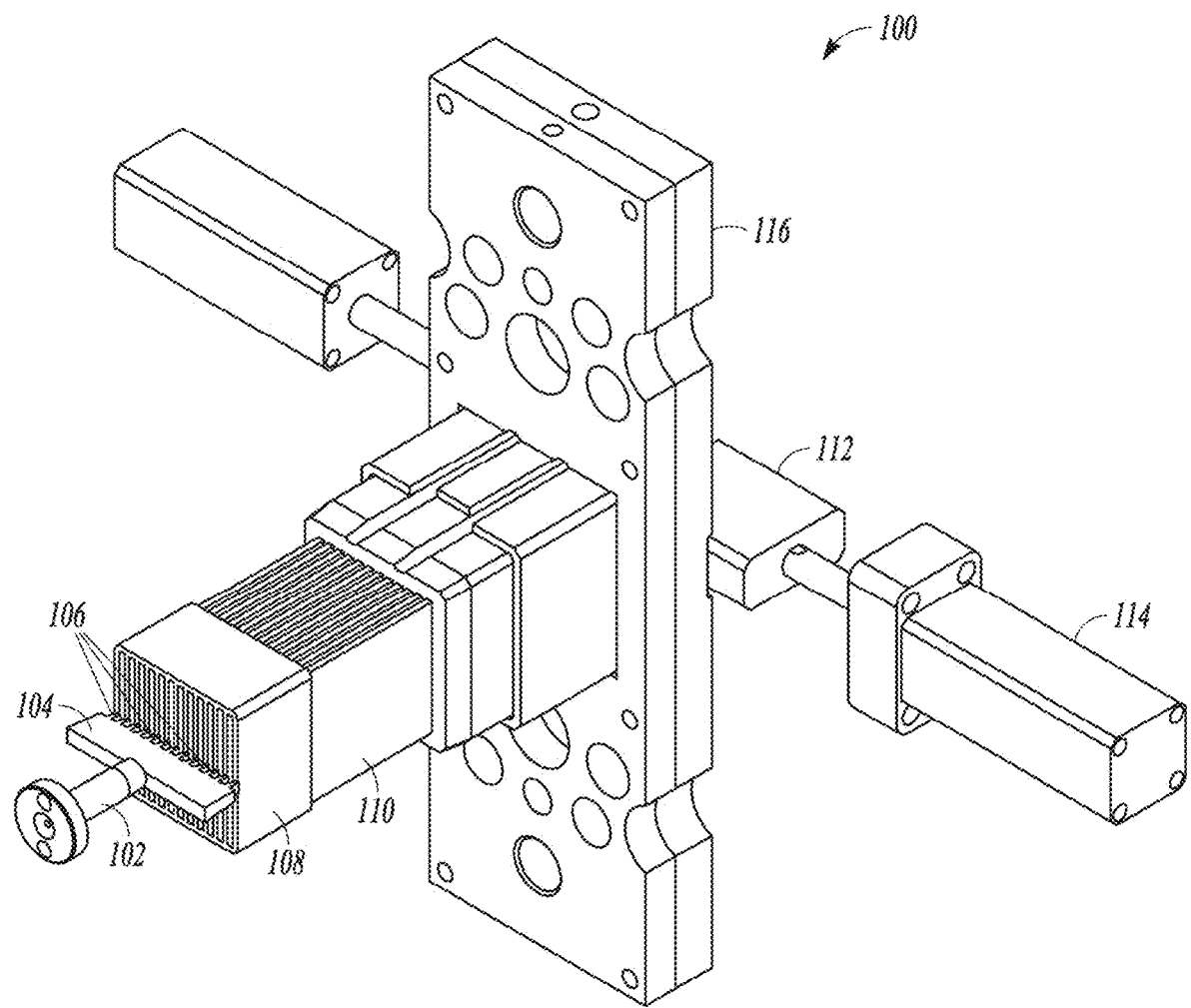
FIG. 1 illustrates portions of an injection molding system and a first part made from a solidified first shot of molten polymeric feed material.

FIG. 1 illustrates one example of the present invention in the form of portions of an injection molding system 100. System 100 includes a sprue bushing 102, a runner 104, a plurality of gates 106, a mold core 110, a lock 112, a hydraulic cylinder 114, and a plate 116. FIG. 1 also illustrates a first part 108 made from a solidified first shot of molten polymeric feed material.

The sprue bushing 102 is in direct or indirect fluid communication with a melt source of molten material (not illustrated in the figures), such as a heated screw. As illustrated in system 100, the sprue bushing 102 is also in direct fluid communication with a runner 104, though in other examples of the invention the sprue bushing may be in indirect fluid communication with a runner. The runner 104 is in direct fluid communication with a series of injection gates and indirect fluid communication with the mold cavity (not fully illustrated in the figures) of the injection molding system 100. As used herein, when two components of the invention are described as being in "direct fluid communication", it is meant that a fluid can pass from the first component to the second component without travelling through any intermediary components. When two components of the invention are described as being in "indirect fluid communication", it is meant that the fluid can pass from the first component to the second component but must first travel through one or more intermediary components.

The plate 116 is driven by a hydraulic cylinder (not fully illustrated in the figures) which moves the plate 116 forward and backward. The plate 116 is secured to the mold core 110. The mold core 110 is movable relative to the runner 104 and the sprue bushing 102. The hydraulic cylinder 114 can be used to engage or disengage the lock 112 with the plate 116, thereby allowing the system 100 to lock the position of mold core 110 relative to the runner 104 and the sprue bushing 102.

Figure 2:
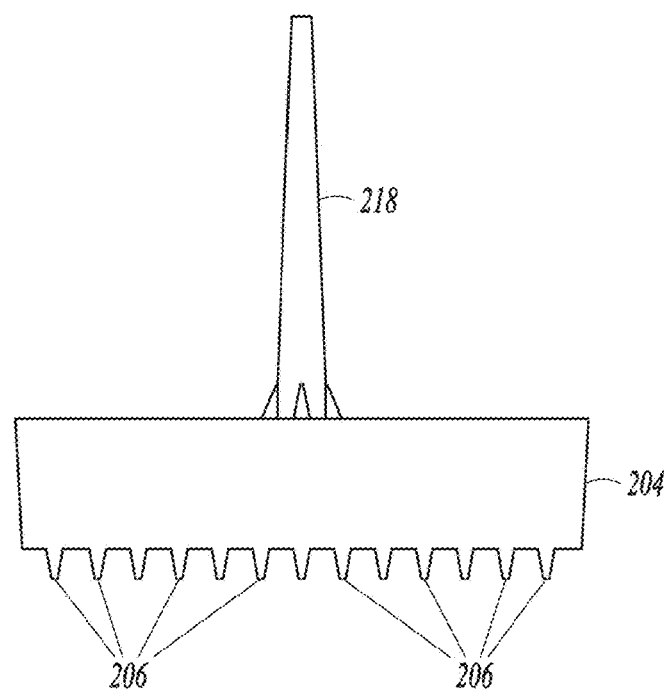
FIG. 2 illustrates a side view of a sprue, a runner, and a plurality of gates.

FIG. 2 illustrates another example of the present invention in the form of a side view illustration of a sprue 218, a runner 204, and a plurality of gates 206. The sprue 218 and runner 204 are shared by the plurality of gates 206 and, in operation, are all in fluid communication with one another. In the example shown in FIG. 2, each individual gate 206 defines a gate orifice area of approximately 5.0 millimeters in length and 1.6 millimeters in width.

The present invention also includes methods of injection molding an article. FIGS. 3A-3E illustrate one example of a method of the invention.

Figure 3A:
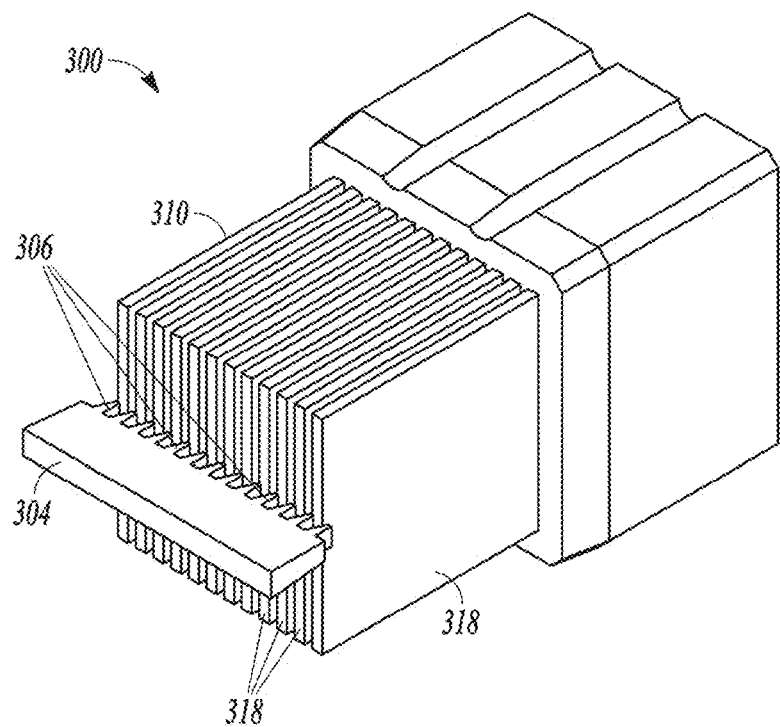
FIGS. 3A-3E illustrate one example of a method of the invention.

FIG. 3A illustrates some of the initial steps of an exemplar method, which includes providing an injection molding machine or system 300. The injection molding system 300 used in this method includes the same components as system 100 illustrate in FIG. 1, though a number of the components have been omitted from FIGS. 3A-3E for clarity. The system 300 includes a melt source of molten material, a mold defining a mold cavity, one or more gates 306, and a mold core 310 movable relative to the one or more gates 306. A runner 304 feeds all of the gates 306 with molten material during operation. The molten material may be a thermoplastic, a thermosetting material, or an elastomer and mold core 310 may be a reusable mold core.

Figure 3B:
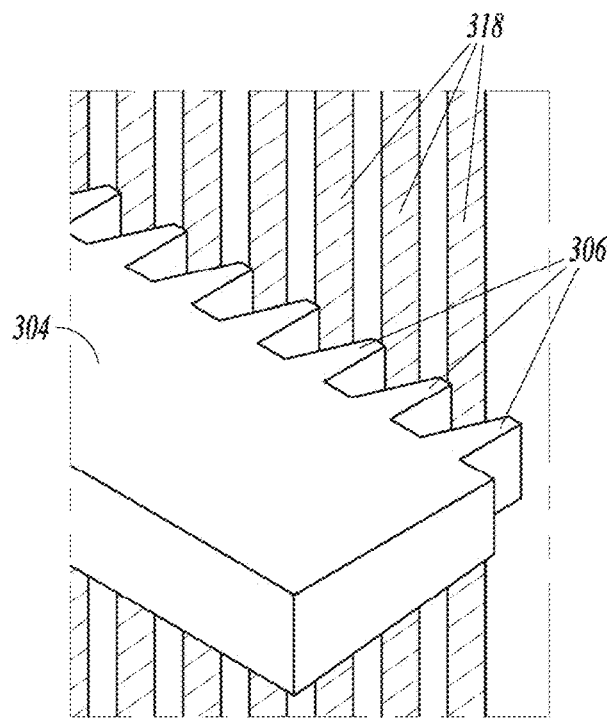

The one or more gates 306 collectively define a total orifice area through which molten material will be injected into the mold cavity and the mold core 310 is directed or positioned next to the one or more gates 306 such that the mold core 310 obstructs or occludes a first portion of that total orifice area of the one or more gates 306. The second or remaining portion of the one or more gates 306 is unobstructed by the mold core 310. FIG. 3A illustrate the gate obstruction and FIG. 3B illustrates a close up view. As shown in FIG. 3A, the mold core 310 includes a series of parallel "teeth" or prongs 318 arranged in a parallel fashion and having parallel opposing surfaces. In other examples, the mold core may obstruct the entire orifice area of a portion of the one or more gates while leaving the remaining gates unobstructed. In either example, the mold core is obstructing a portion of the total orifice are of the gates. To state it another way, the mold core obstructs a portion of the total orifice area of the gates and may do so by partially obstructing each gate or by completely obstructing a portion of the gates. For example, the system may be designed such that the mold core obstructs half of the total orifice area of the gates by obstructing half of the orifice area of each gate or obstructing all of the orifice area of half of the gates. In further examples, the mold core may obstruct anywhere from 1-99% of the total orifice area and may do so by obstructing 1-100% of the orifice area of 1-100% of the gates in the system (provided that at least some portion of the total orifice area remain unobstructed).

Figure 3C:
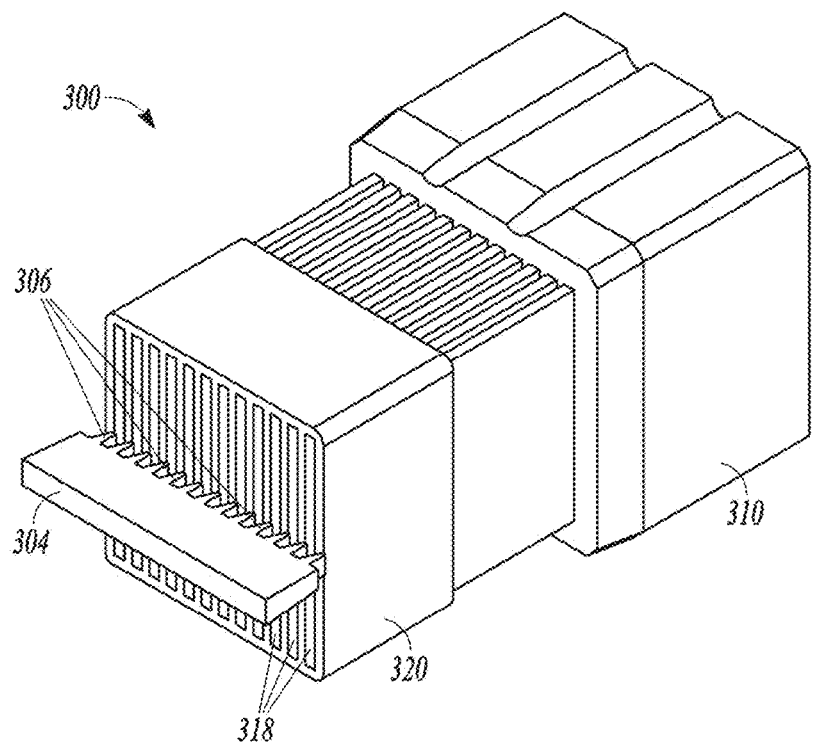

While the mold core 310 is obstructing a portion of the total orifice area of the one or more gates 306, a first shot of molten material is directed or injected into the mold cavity through the unobstructed portion of the total orifice area of the one or more gates 306. When the first shot of molten material enters the mold cavity, the flow boundaries of the cavity are at least partially defined by the surfaces of the mold core 310 and the first shot of molten material infiltrates and flows into the spaces that separate opposing parallel faces of the adjacent prongs 318 of the mold core 310. After injection, the first shot of molten material is solidified to form a first part 320 of the molded article, as illustrated in FIG. 3C. The mold core 310 may define channels for the flow of cooling fluid (e.g., water or other cooling media) so that the first part 320 can be quickly cooled, while in other examples the mold core 310 may not include cooling channels and may simply be a solid core.

Figure 3D:
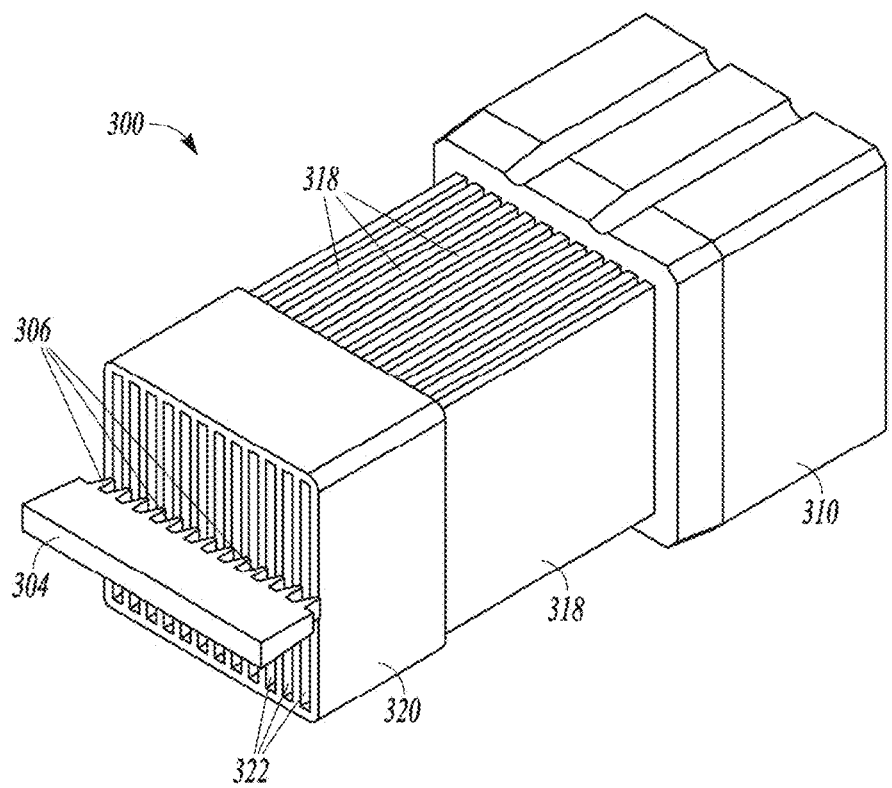

After the first part 320 of the molded article has been formed, the mold core 310 is directed away from the one or more gates 306, as illustrated in FIG. 3D. A space for a second shot of molten material is formed when the prongs 318 of the mold core 310 are pulled back from the one or more gates 306 and the runner 304. That is, each of the prongs 318 leaves a complementary space or void 322 when the mold core 310 is pulled away from the gates 306 and, collectively, those voids 322 form a space for additional shots of molten material. Pulling the mold core 310 away from the one or more gates 306 also opens up the previously obstructed portion of the total orifice area of the one or more gates 306. That is, directing the mold core 310 away from the one or more gates 306 removes the obstruction of the gates 306 by the mold core 310.

After the mold core 310 is directed away from the one or more gates 306, a second shot of molten material is directed into the mold cavity through the portion of the total orifice area of the one or more gates 306 that was previously obstructed by the mold core 310 while the portion of the total orifice area through which the first shot of molten material was injected remains obstructed by the first part 320 of the molded article. As the second shot is injected, the molten material fills the voids 322 forming the second shot space of the mold cavity.

Figure 3E:
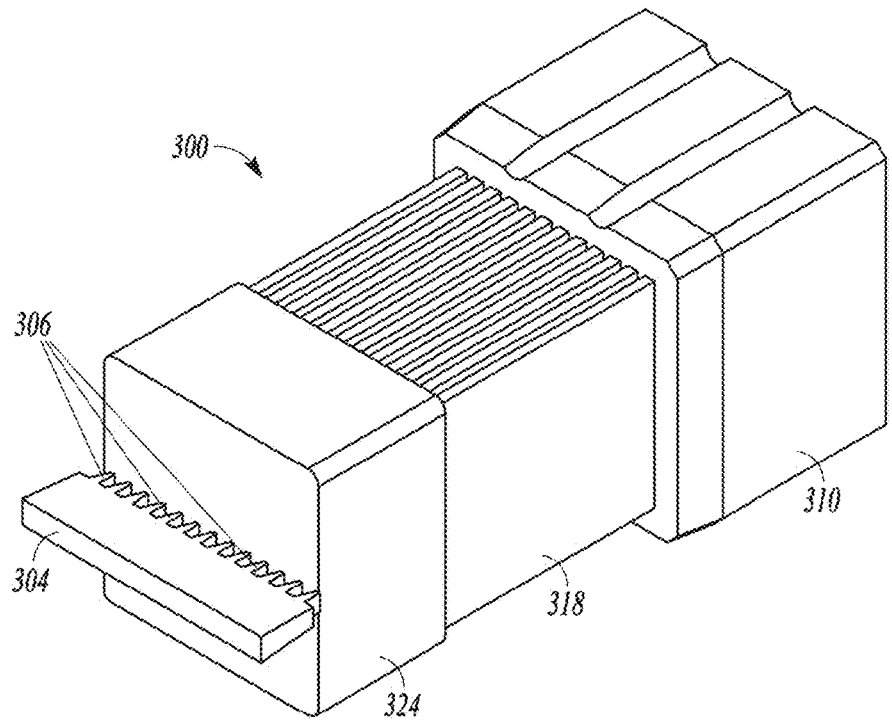

After the second shot is injected, the second shot of molten material is solidified to form a second part of the molded article 324, as illustrated in FIG. 3E. As shown, molded article 324 is a polymer square or rectilinear block. While the molded article 324 in FIG. 3E is shown as a square or rectilinear block, the methods of this invention can create virtually any shape that is amendable to being formed in a two-step injection process where the mold core is used to obstruct a first portion of the total gate orifice area and then pulled back to provide space for a second shot of material.

Figure 3F:
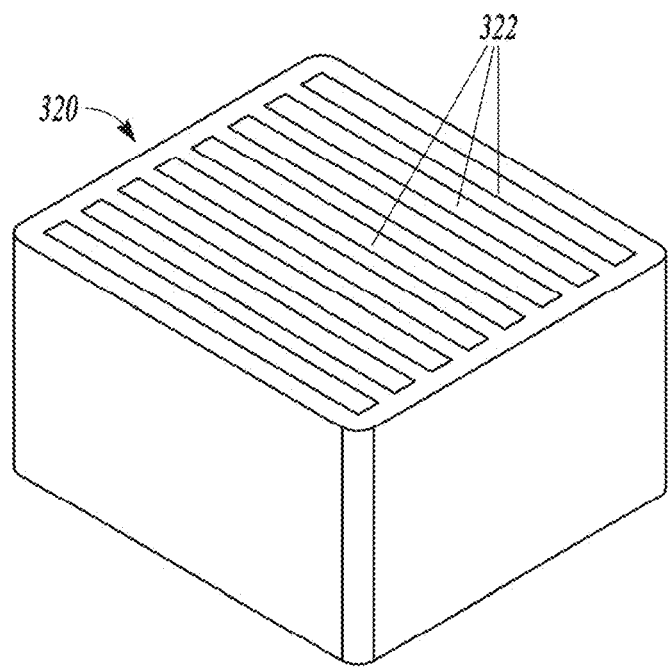
FIG. 3F illustrates a perspective view of a first part.
Figure 3G:
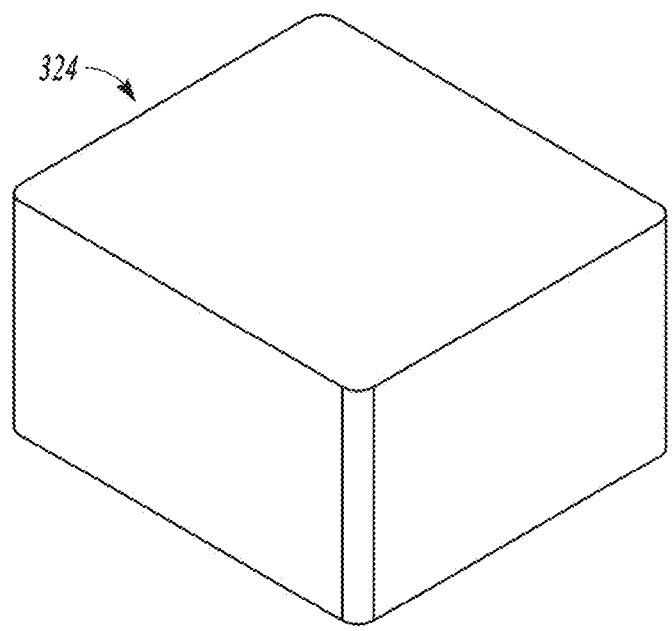
FIG. 3G illustrates a perspective view of a finished molded article.

FIG. 3F illustrates a perspective view of a first part 320 formed after solidification of the first shot of molten material. As can be seen, the first part 320 includes a plurality of parallel portions formed when the molten material is injected into a mold cavity and flows between the prongs 318 of the mold core 310, thereby resulting in a plurality of voids 322. FIG. 3G illustrates a perspective view of the finished molded article 324 after it has been ejected from the system 300. As can be seen, the article 324 is a solid cube of polymer material.

While first part 320 and article 324 are cube-shaped, the present invention can be used to produce a wide range of differently shaped parts and finished articles. FIGS. 4A-4J show just a small variety of the different shaped articles that can be made with the present invention.

Figure 4A:
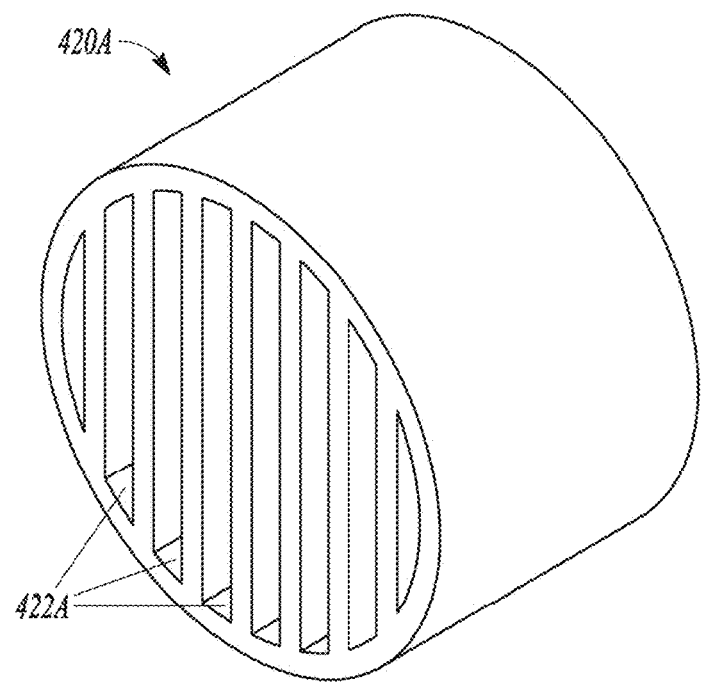
FIGS. 4A-4J illustrate perspective views of differently shaped first parts and finished articles.
Figure 4B:
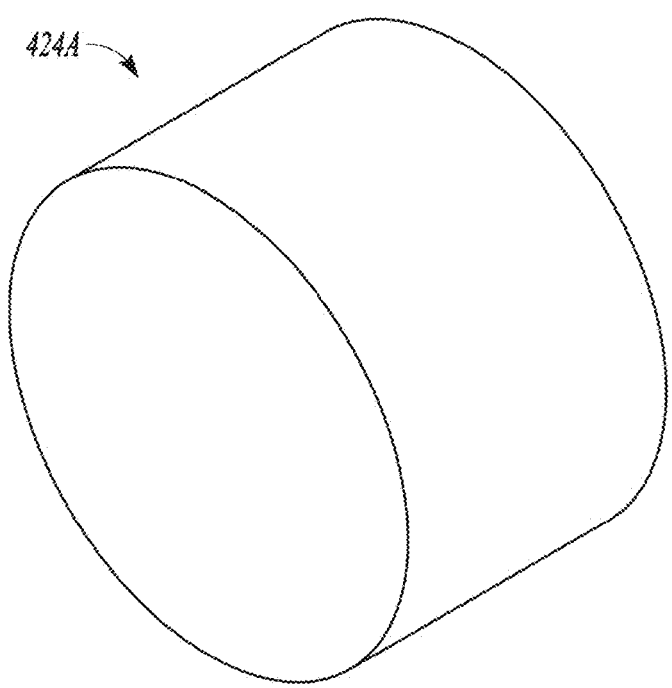

FIG. 4A illustrates a tube-shaped first part 420A formed by the methods of the present invention. The first part 420A includes a circular cross-sectional shape. The prongs of a mold core have left a plurality of voids 422A in the first part 420A. FIG. 4B illustrates the finished article 424A formed after the voids 422A have been filled by subsequent shots of molten material (e.g., by a second shot of molten material).

Figure 4C:
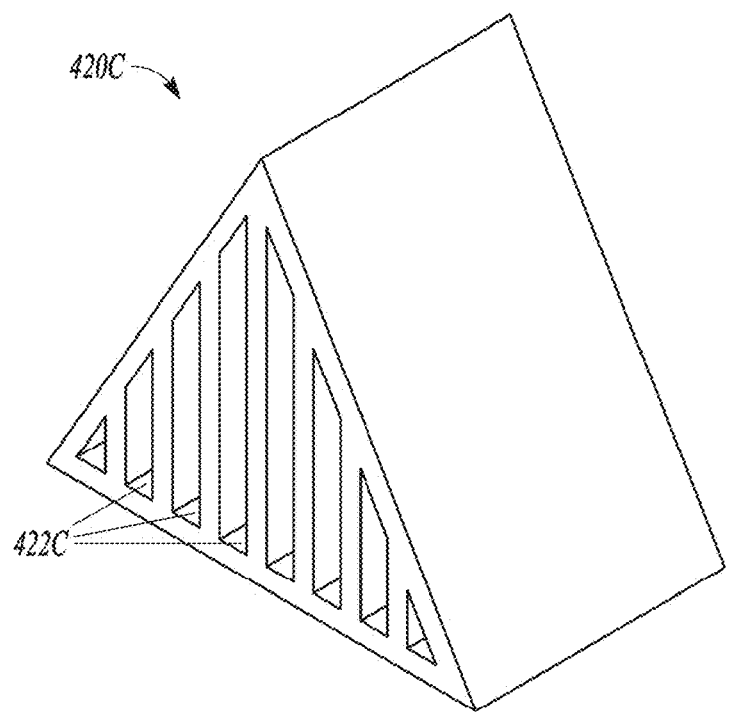
Figure 4D:
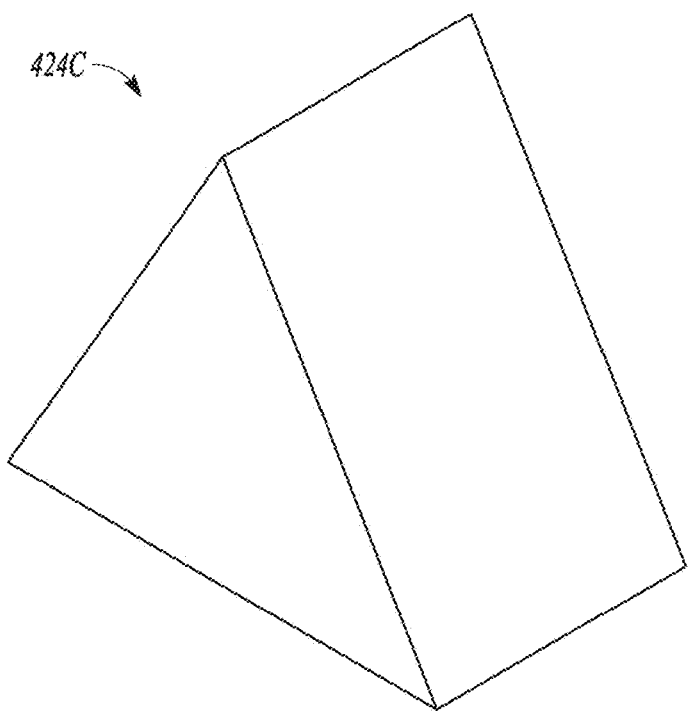

FIG. 4C illustrates a tube-shaped first part 420C formed by the methods of the present invention. The first part 420C includes a triangular cross-sectional shape. The prongs of a mold core have left a plurality of voids 422C in the first part 420C. FIG. 4D illustrates the finished article 424C formed after the voids 422C have been filled by subsequent shots of molten material (e.g., by a second shot of molten material).

Figure 4E:
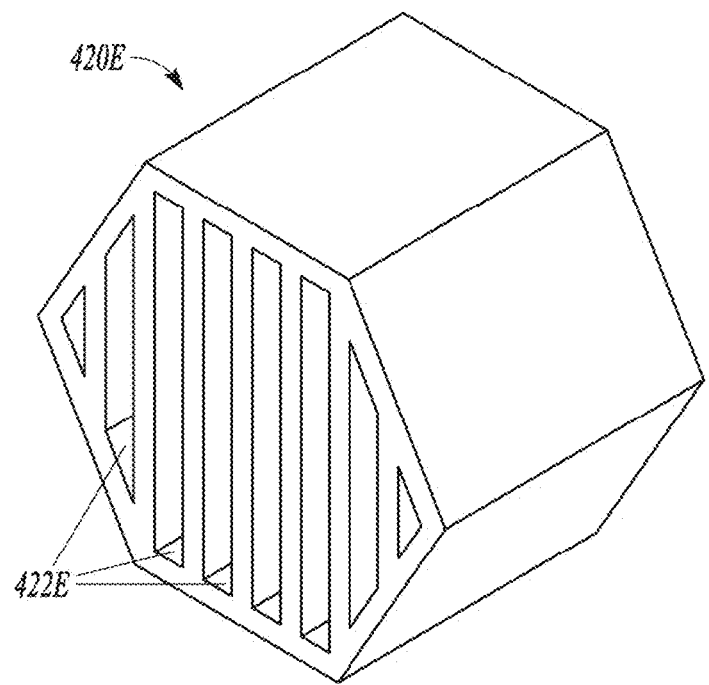
Figure 4F:
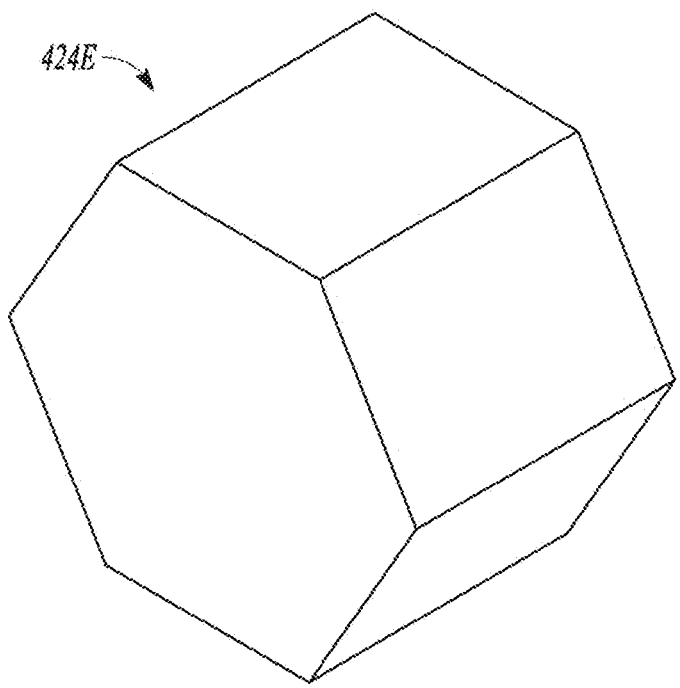

FIG. 4E illustrates a tube-shaped first part 420E formed by the methods of the present invention. The first part 420E includes a hexagonal cross-sectional shape. The prongs of a mold core have left a plurality of voids 422E in the first part 420E. FIG. 4F illustrates the finished article 424E formed after the voids 422E have been filled by subsequent shots of molten material (e.g., by a second shot of molten material).

Figure 4G:
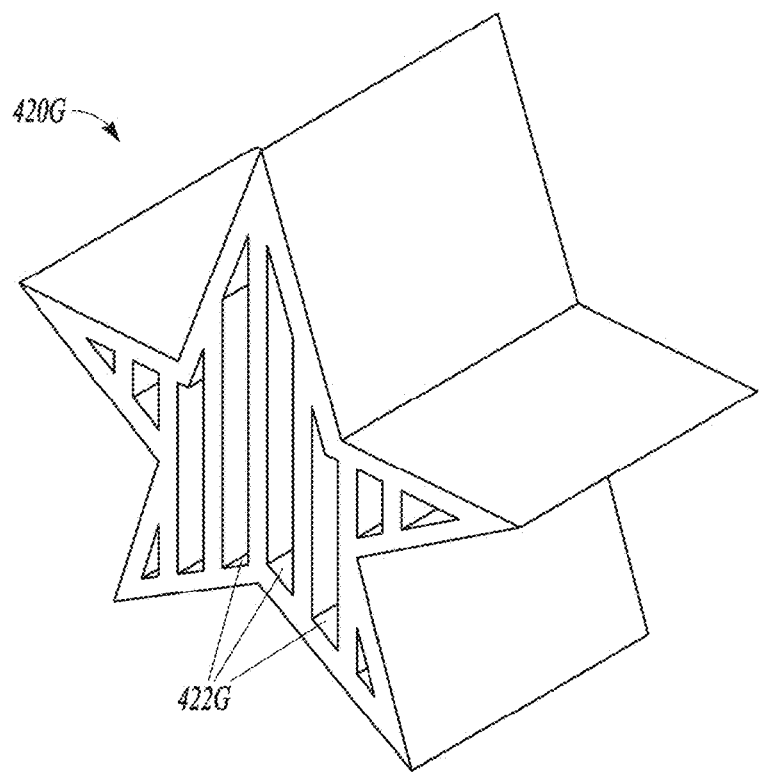
Figure 4H:
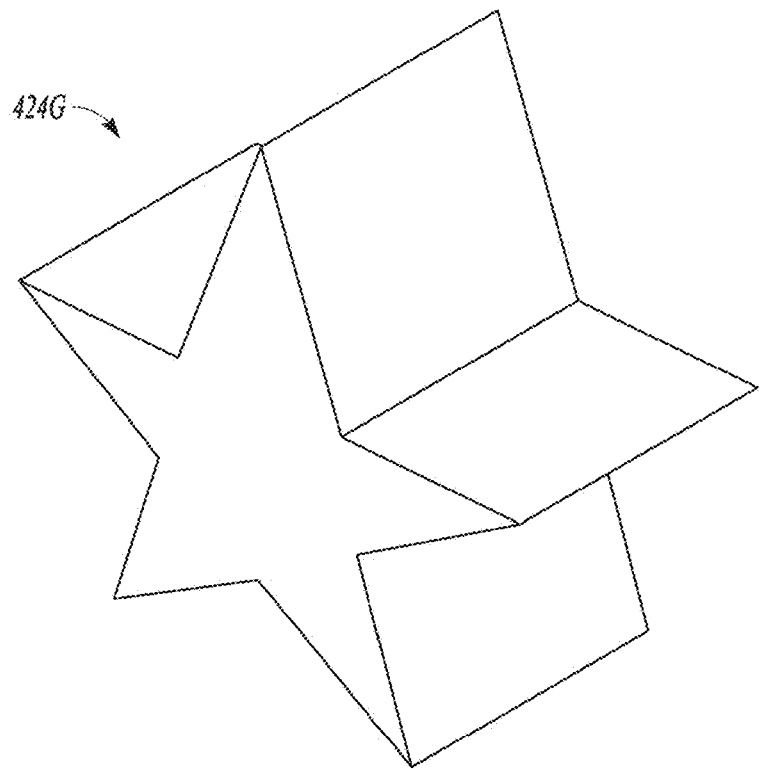

FIG. 4G illustrates a tube-shaped first part 420G formed by the methods of the present invention. The first part 420G includes a star-shaped cross-section. The prongs of a mold core have left a plurality of voids 422G in the first part 420G. FIG. 4H illustrates the finished article 424G formed after the voids 422G have been filled by subsequent shots of molten material (e.g., by a second shot of molten material).

Figure 4I:
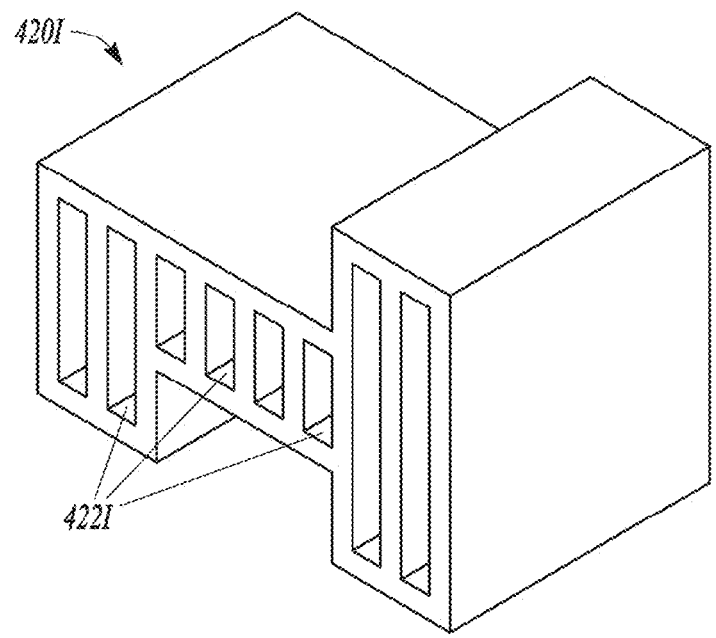
Figure 4J:
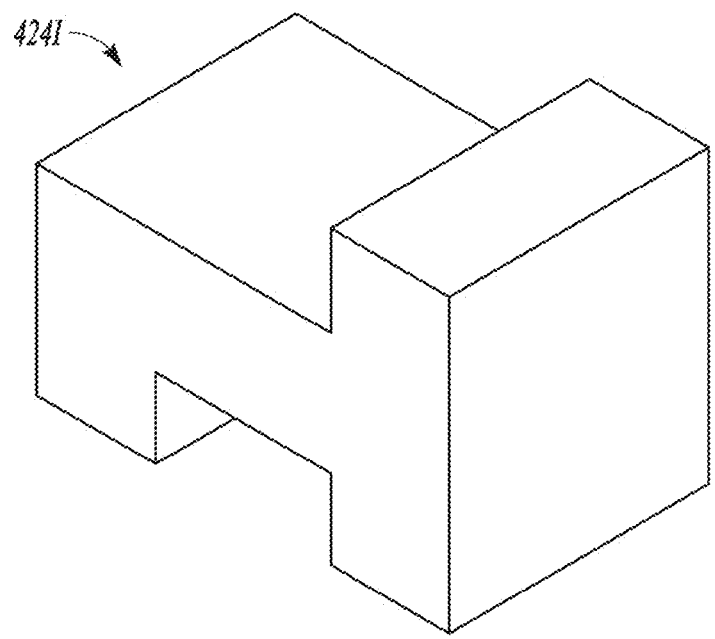

FIG. 4I illustrates a block-shaped first part 420I formed by the methods of the present invention. The first part 420I is shaped in the form of a tube having an irregular polygonal cross-sectional shape. The prongs of a mold core have left a plurality of voids 422I in the first part 420I. FIG. 4J illustrates the finished article 424I formed after the voids 422I have been filled by subsequent shots of molten material (e.g., by a second shot of molten material).

Embodiment 1

A method of injection molding an article, the method comprising: using an injection molding machine that includes a melt source of molten material, a mold defining a mold cavity, a gate, in fluid communication with the melt source and the mold cavity, wherein gate defines a total orifice area, and a mold core movable relative to the gate; directing a first shot of molten material into the mold cavity through a first portion of the total orifice area while simultaneously occluding a second portion of the total orifice area with the mold core; solidifying the first shot of molten material to form a first part of the article; directing the mold core away from the gate after the first part has been formed; directing a second shot of molten material into the mold cavity through the second portion of the total orifice area while simultaneously occluding the first portion of the total orifice area with the first part of the article; and solidifying the second shot of molten material to form a second part of the article.

Embodiment 2

A method of injection molding an article, the method comprising: using an injection molding machine that includes a melt source of molten material, a mold defining a mold cavity, two or more gates, in fluid communication with the melt source and the mold cavity, wherein the gates collectively define a total orifice area, and a mold core movable relative to the gates; directing a first shot of molten material into the mold cavity through a first portion of the total orifice area while simultaneously occluding a second portion of the total orifice area with the mold core: solidifying the first shot of molten material to form a first part of the article; directing the mold core away from the gate after the first part has been formed; directing a second shot of molten material into the mold cavity through the second portion of the total orifice area while simultaneously occluding the first portion of the total orifice area with the first part of the article: and solidifying the second shot of molten material to form a second part of the article.

Embodiment 3

A method of injection molding an article, the method comprising: providing (preferably using) an injection molding machine that includes a melt source of molten material, a mold defining a mold cavity, one or more gates in fluid communication with the melt source and the mold cavity, wherein the one or more gates collectively define a total orifice area, and a mold core movable relative to the one or more gates; directing a first shot of molten material into the mold cavity through a first portion of the total orifice area while simultaneously occluding a second portion of the total orifice area with the mold core; solidifying the first shot of molten material to form a first part of the article; directing the mold core away from the one or more gates after the first part has been formed; directing a second shot of molten material into the mold cavity through the second portion of the total orifice area while simultaneously occluding the first portion of the total orifice area with the first part of the article; and solidifying the second shot of molten material to form a second part of the article.

Embodiment 4

The method of any of Embodiments 1-3, further including directing the mold core towards the gate to occlude the second portion of the total orifice area and before directing a first shot of molten material into the mold cavity.

Embodiment 5

The method of Embodiment 4, wherein occluding the second portion of the total orifice area with the mold core includes contacting and occluding half of each of the gate(s) with the mold core.

Embodiment 6

The method of Embodiment 4, wherein occluding the second portion of the total orifice area with the mold core includes contacting and completely occluding half of the gates with the mold core.

Embodiment 7

The method of any of Embodiments 1-6, wherein the first part of the article remains stationary relative to the gate while the mold core is directed away from the gate after the first part has been formed.

Embodiment 8

The method of any of Embodiments 1-7, wherein the mold core is reusable.

Embodiment 9

The method of any of Embodiments 1-8, wherein the mold core has a shape that includes a plurality of prongs with parallel opposing surfaces.

Embodiment 10

The method of Embodiment 9, wherein the first shot of molten material is directed between the prongs while the prongs are simultaneously occluding the second portion of the total orifice area.

Embodiment 11

The method of Embodiment 10, wherein the second shot of molten material is directed into a space in the mold cavity previously occupied by the prongs of the mold core when the first shot of molten material was directed into the mold cavity.

Embodiment 12

The method of any of Embodiments 1-11, wherein the injection molding machine further includes a runner in fluid communication with the melt source and at least some of the gates.

Embodiment 13

The method of Embodiment 12, wherein all of the gates are in fluid communication with the runner.

Embodiment 14

The method of any of Embodiments 1-13, wherein forming the second part of the article completes the article.

Embodiment 15

The method of any of Embodiments 1-14, wherein the article has a quadrilateral shape, a circular shape, a triangular shape, a hexagonal shape, a star shape, or an irregular polygonal shape when completed.

Embodiment 16

The method of any of Embodiments 1-15, wherein the injection molding machine is a one-shot injection machine.

Embodiment 17

The method of any of Embodiments 1-16, wherein the molten material comprises at least one of: a thermoplastic polymer, a thermosetting polymer, and an elastomer; preferably the molten material comprises a thermoplastic polymer.

Embodiment 18

The method of any of Embodiments 1-17, wherein the mold core defines at least a portion of the mold cavity.

Embodiment 19

A method of injection molding an article, the method comprising: using an injection molding machine that includes a melt source of molten material, a mold defining a mold cavity, one or more gates in fluid communication with the melt source and the mold cavity, wherein the one or more gates collectively define a total orifice area, and a mold core movable relative to the one or more gates, wherein the mold core includes a plurality of prongs with parallel opposing surfaces; contacting the one or more gates with the prongs of the mold core to occlude a first portion of the total orifice area, wherein the prongs of the mold core at least partially define a first shot space along the parallel opposing surfaces of the prongs and wherein the prongs occupy a second shot space; directing a first shot of molten material into the first shot space; solidifying the first shot of molten material to form a first part of the article occupying the first shot space; directing the prongs of the mold core away from the one or more gates to remove the prongs from the second shot space after the first part is formed, wherein the first part at least partially defines the second shot space; directing a second shot of molten material into the second shot space while the first part contacts the one or more gates and occludes a second portion of the total orifice area; and solidifying the second shot of molten material to form a second part of the article.

Embodiment 20

The method of Embodiment 19, wherein occluding the first portion of the total orifice area includes occluding half of each of the one or more gates with the mold core.

Embodiment 21

The method of Embodiment 19, wherein occluding the second portion of the total orifice area with the mold core includes contacting and completely occluding half of the one or more gates with the mold core.

Embodiment 22

The method of any of Embodiments 19-21, wherein all of the gates are in fluid communication with a single runner.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Further, it shall be understood that any numerical ranges explicitly disclosed in this document shall include any subset of the explicitly disclosed range as if such subset ranges were also explicitly disclosed; for example, a disclosed range of 1-100 shall also include the ranges 1-80, 2-76, or any other numerical range that falls between 1 and 100. In another example, a disclosed range of "1,000 or less" shall also include any range that is less than 1,000, such as 50-100, 25-29, or 200-1,000. The suffix "(s)" as used herein is intended to include both the singular and the plural of the term that it modifies, thereby including one or more of that term (e.g., the gate(s) includes one or more gates).

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times.

Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method of injection molding an article, the method comprising:
   using an injection molding machine that includes
      a melt source of molten material,
      a mold defining a mold cavity,
      a gate in fluid communication with the melt source and the mold cavity,
      wherein the gate defines an orifice area, and
      a mold core movable relative to the gate;
   directing a first shot of molten material into the mold cavity through a first portion of the orifice area of the gate while simultaneously occluding a second portion of the orifice area of the gate with the mold core;
   solidifying the first shot of molten material to form a first part of the article;
   directing the mold core away from the gate after the first part has been formed;
   directing a second shot of molten material into the mold cavity through the second portion of the orifice area of the gate while simultaneously occluding the first portion of the orifice area of the gate with the first part of the article; and
   solidifying the second shot of molten material to form a second part of the article,
   wherein the mold core has a shape that includes a plurality of prongs with parallel opposing surfaces, and
   wherein the first shot of molten material is directed between the prongs while the prongs are simultaneously occluding the second portion of the orifice area.

2. The method of claim 1, wherein the molten material is a thermoplastic polymer, a thermosetting polymer, or an elastomer.

3. The method of claim 1, further including directing the mold core towards the gate to occlude the second portion of the orifice area of the gate before directing a first shot of molten material into the mold cavity.

4. The method of claim 1, wherein the first part of the article remains stationary relative to the gate while the mold core is directed away from the gate after the first part has been formed.

5. The method of claim 1, wherein the mold core defines at least a portion of the mold cavity.

6. The method of claim 1, wherein the mold core is reusable.

7. The method of claim 1, wherein the second shot of molten material is directed into a space in the mold cavity previously occupied by the prongs of the mold core when the first shot of molten material was directed into the mold cavity.

8. A method of injection molding an article, the method comprising:
   using an injection molding machine that includes
   a melt source of molten material,
   a mold defining a mold cavity,
   a first gate in fluid communication with the melt source and the mold cavity,
   wherein the first gate defines an orifice area, and
   a mold core movable relative to the first gate;
   directing a first shot of molten material into the mold cavity through a first portion of the orifice area of the first gate while simultaneously occluding a second portion of the orifice area of the first gate with the mold core;
   solidifying the first shot of molten material to form a first part of the article;
   directing the mold core away from the first gate after the first part has been formed;
   directing a second shot of molten material into the mold cavity through the second portion of the orifice area of the first gate while simultaneously occluding the first portion of the orifice area of the first gate with the first part of the article; and solidifying the second shot of molten material to form a second part of the article; and
   wherein the injection molding machine includes a plurality of gates that each define an orifice area and the mold core includes a plurality of prongs with parallel opposing surfaces, and wherein directing the first shot of molten material into the mold cavity includes directing the molten material though a first portion of the orifice area of each gate while simultaneously occluding a second portion of the orifice area of each gate with the prongs of the mold core, and wherein directing a second shot of molten material into the mold cavity includes directing the molten material through the second portion of the orifice area of each gate while simultaneously occluding the first portion of the orifice area of each gate with the first part of the article.

9. The method of claim 8, wherein forming the second part of the article completes the article.

10. The method of claim 8, wherein the article has a quadrilateral shape, a circular shape, a triangular shape, a hexagonal shape, a star shape, or an irregular polygonal shape when completed.

11. The method of claim 8, wherein the injection molding machine is a one-shot injection machine.

12. The method of claim 8, wherein the injection molding machine further includes a runner in fluid communication with the melt source and the gate.

13. The method of claim 8, wherein occluding the first portion of the orifice area of each gate includes occluding half of each of the plurality of gates with the mold core.

14. The method of claim 8, and wherein all of the gates are in fluid communication with a single runner.

15. The method of claim 8, wherein:
   the molten material is a thermoplastic polymer, a thermosetting polymer, or an elastomer; and/or
   the molten material is reusable.

16. The method of claim 8, further including directing the mold core towards the first gate to occlude the second portion of the orifice area of the first gate before directing a first shot of molten material into the mold cavity.

17. The method of claim 8, wherein the first part of the article remains stationary relative to the first gate while the mold core is directed away from the first gate after the first part has been formed.

18. The method of claim 8, wherein the mold core defines at least a portion of the mold cavity.

19. A method of injection molding an article, the method comprising:
   using an injection molding machine that includes
   a melt source of molten material,
   a mold defining a mold cavity,
   a first gate in fluid communication with the melt source and the mold cavity,
   wherein the first gate defines an orifice area, and
   a mold core movable relative to the first gate;
   directing a first shot of molten material into the mold cavity through a first portion of the orifice area of the first gate while simultaneously occluding a second portion of the orifice area of the first gate with the mold core;
   solidifying the first shot of molten material to form a first part of the article;
   directing the mold core away from the first gate after the first part has been formed;
   directing a second shot of molten material into the mold cavity through the second portion of the orifice area of the first gate while simultaneously occluding the first portion of the orifice area of the first gate with the first part of the article; and solidifying the second shot of molten material to form a second part of the article; and
   wherein the injection molding machine includes a plurality of gates that each define an orifice area wherein directing the first shot of molten material into the mold cavity includes directing the molten material though a first portion of the orifice area of each gate while simultaneously occluding a second portion of the orifice area of each gate with the mold core.

20. The method of claim 19 wherein the article is a polymer block having multiple layers.

21. The method of claim 19 wherein the mold core has a shape that includes a plurality of prongs with parallel opposing surfaces wherein the prongs occupy a second shot space during the directing of the first shot of molten material.

22. The method of claim 19, wherein:
   the molten material is a thermoplastic polymer, a thermosetting polymer, or an elastomer; and/or
   the molten material is reusable.

23. The method of claim 19, further including directing the mold core towards the first gate to occlude the second portion of the orifice area of the first gate before directing a first shot of molten material into the mold cavity.

24. The method of claim 19, wherein the first part of the article remains stationary relative to the first gate while the mold core is directed away from the first gate after the first part has been formed.

25. The method of claim 19, wherein the mold core defines at least a portion of the mold cavity.

* * * * *